Oct. 1, 1968

H. C. RETTGER, JR 3,403,927

PEDAL-PROPELLED TRICYCLE VEHICLES

Filed Dec. 10, 1965

INVENTOR.
HARRY C. RETTGER, JR.
BY
ATTORNEY

Oct. 1, 1968  H. C. RETTGER, JR  3,403,927
PEDAL-PROPELLED TRICYCLE VEHICLES
Filed Dec. 10, 1965  2 Sheets-Sheet 2
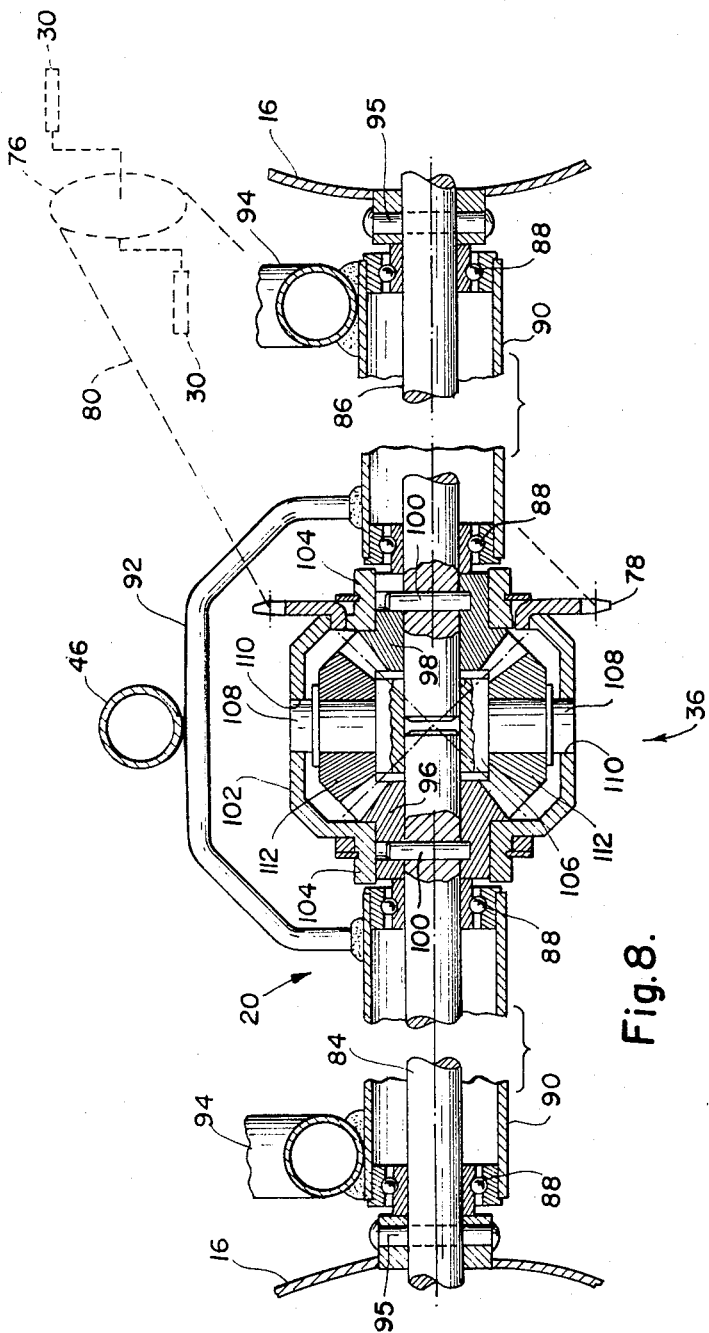
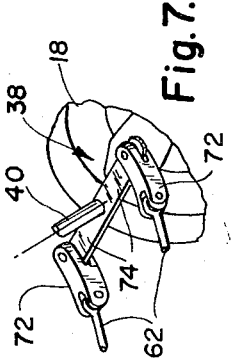
INVENTOR.
HARRY C. RETTGER, JR.
BY
ATTORNEY United States Patent Office 3,403,927
Patented Oct. 1, 1968

3,403,927
PEDAL-PROPELLED TRICYCLE VEHICLES
Harry C. Rettger, Jr., 3557 Ridgewood Drive,
Pittsburgh, Pa. 15235
Filed Dec. 10, 1965, Ser. No. 512,859
8 Claims. (Cl. 280—261)

ABSTRACT OF THE DISCLOSURE

Tricycle vehicles of the type in which the rider provides the power for moving the vehicle, and more particularly to improvements in the steering action and drive arrangement of tricycle vehicles of the type described.

---

Tricycle vehicles are known, in which steering is effected by means of a single wheel at the rear of the vehicle. Examples of such tricycle vehicles will be found in U.S. Patent Nos. 1,472,498, 1,520,523, 1,754,430, 1,778,143 and 2,177,793.

In these and other similar tricycle vehicles, steering is effected by linkage systems of a 1:1 ratio, that is to say, the steering wheel and the single rear wheel are turned simultaneously through the same number of angular degrees. Such steering systems are quick-acting and stiff. Consequently, the steering is "jerky" and results in the zigzag motion normally seen in tricycle vehicles of the prior art. It should be evident that such steering systems do not, as would be desirable, simulate the steering action of a conventional automobile.

Although the stability of the prior tricycle vehicles is relatively good, these vehicles do, occasionally, upset and result in injuries to the child. Upsetting of these vehicles can be attributed, in part, to the relatively quick steering action and, in part, to the poor distribution of the child's weight relative to the wheels.

Accordingly, as an overall object, the present invention seeks to provide an improved tricycle vehicle.

Another object of the invention is to provide a tricycle vehicle having improved stability.

Still another object of the invention is to provide a tricycle vehicle having a steering action which is smooth and simulates, to a great extent, the steering action of a conventional automobile.

Still another object of the invention is to provide a tricycle vehicle having an improved steering action and incorporating a differential drive arrangement whereby relatively sharp turns may be made without upsetting the vehicle and without subjecting the tires to the wear found in the prior art vehicles.

A further object of the invention is to provide a tricycle vehicle having adjustable foot pedals whereby the vehicle will accommodate children of different heights.

In accordance with the present invention, a tricycle vehicle is provided which is powered by the child riding the same. The tricycle vehicle of the invention comprises a frame carrying a driver's seat and having ground engaging wheels journaled thereto. A pair of the wheels are positioned ahead of the driver's seat while a single wheel is positioned to the rear of the driver's seat and connected to the frame in a manner which permits steering of the vehicle.

The vehicle of the invention is provided with a steering wheel which is operatively connected to the single rear wheel by linkage means which includes a gear means arranged such that turning of the single rear wheel is affected by multiple revolutions of the steering wheel.

To power the vehicle, a set of conventional foot pedals are mounted on the frame and are connected to the pair of front drive wheels for forcibly rotating the same. A differential drive is provided between the foot pedals and the pair of front drive wheels and is arranged such that the front drive wheels are driven at the same speed during substantially straight-forward or backward motion of the tricycle vehicle and which are driven at different speeds when the tricycle vehicle is turned to the right or to the left.

The foot pedals are supported on the frame ahead of the front drive wheels. The arrangement is such that a more efficient distribution of the child's weight is achieved which, in turn, results in an increase in the stability of the vehicle, and an increase in the traction between the drive wheels and the ground. The foot pedals are adjustably connected to the frame whereby they can be moved toward or away from the seat and hence accommodate children of different heights.

The above and other objects and advantages of the present invention will become apparent from the following detailed description by reference to the accompanying drawings, in which:

FIG. 7 is a fragmentary isometric view, illustrating the connection of a linkage to the single rearwardly mounted wheel; and FIG. 8 is a cross-sectional view, taken along the line VIII—VIII of FIG. 3, illustrating differential driving means employed in the vehicle of the invention.

General description

Figure 2:
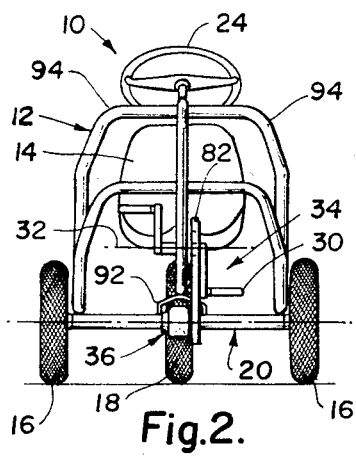
FIG. 2 is a front view of the tricycle vehicle of the invention.
Figure 1:
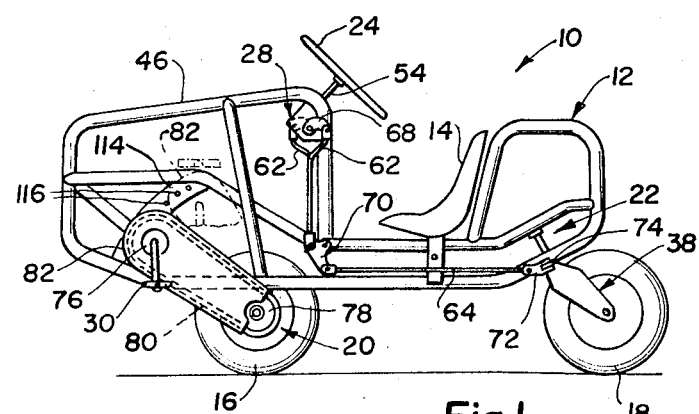
FIGURE 1 is a side view of the tricycle vehicle of the invention.
Figure 3:
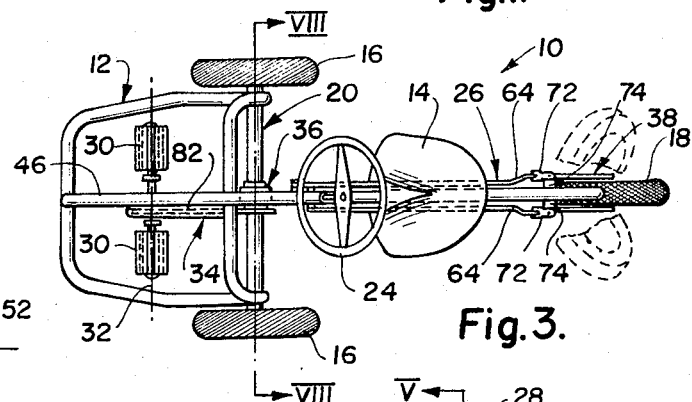
FIG. 3 is a plan view of the tricycle vehicle of the invention.

Reference is now directed to FIGS. 1–3, inclusive, wherein there is illustrated a tricycle vehicle 10 of the invention. The tricycle vehicle 10 comprises a frame 12, preferably formed from tubular material and having a seat 14 secured thereto. As is conventional, the seat 14 is adjustable up and down as well as forward and backward. The vehicle 10 is rollably supported on a pair of front wheels 16 and a single rear wheel 18. The front wheels 16 comprise drive wheels and are journaled to the frame 12 by axle means 20 disposed ahead of the seat 14. The single rear wheel 18 serves to steer the vehicle 10 and is connected to the frame 12 by a pivot connection 22.

Steering of the vehicle 10 is affected by a steering wheel 24 acting through linkage means 26 to turn the rear wheel 18. The steering wheel 24 is connected to the linkage means 26 by gear means (not visible) housed within a gear box 28 (FIG. 1). As will be described, the gear means arrangement is such that multiple revolutions of the steering wheel 24 are required to turn the single rear wheel 18. Consequently, the steering action of the vehicle 10 simulates, to a great extent, the steering action of a conventional automobile.

The vehicle 10 is powered by a child who rides the same, that is, the child forcibly rotates a pair of foot pedals 30 which are journaled to the frame 12 for rotation about a pedaling axis 32. As is conventional, the pedaling axis 32 is substantially parallel to the rolling axis of the front wheels 16. The foot pedals 30 are, however, positioned ahead of all of the wheels 16, 18 so as to effect a more efficient distribution of the child's weight relative to the front wheels 16.

As can best be seen in FIG. 1, a torque transferring means 34 is provided for forcibly rotating the axle means 20 and hence the front wheels 16. Differential gearing means 36, best seen in FIGS. 2 and 3, is carried by the axle means 20 and is connected to the torque transferring means 34. The overall arrangement is such that when the vehicle 10 is turned to the left, for example, the left one of the wheels 16, as viewed in FIG. 2, will rotate at a slower speed than the right one of the wheels 16 or be completely stopped, depending on the sharpness of the turn being executed. Consequently, the vehicle 10 is capable of making considerably sharper turns than any of the prior art tricycle vehicles. Furthermore, the wheels 16 are not subjected to the wear normally found in the drive wheels of the prior art tricycle vehicles.

*Steering arrangement*

The steering arrangement of the vehicle 10 will now be more fully described with reference to FIGS. 1, 4–7, inclusive.

Figure 4:
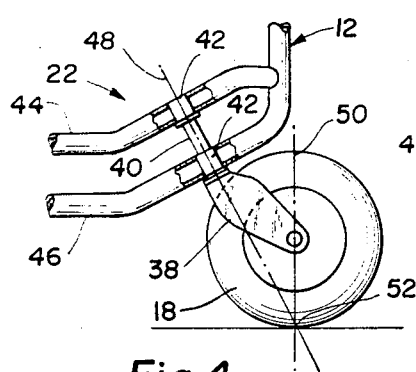
FIG. 4 is a fragmentary side view, on an enlarged scale, illustrating a single rearwardly mounted wheel employed for steering the vehicle of the invention.

Referring now to FIG. 4, it will be seen that the rear wheel 18 is rotatably connected to a clevis member 38 having a central shaft 40 extending through bushings 42 fitted in central frame members 44, 46 of the frame 12. The clevis member 38 and hence the rear wheel 18 are pivotal about a steering axis indicated by the dash-dot line 48 which actually comprises the central axis of the central shaft 40. It is to be noted that the steering axis is inclined forwardly toward the seat 14 (not visible) and intersects with a vertical centerline 50 of the wheel 18 at a point 52, that is, the point at which the rear wheel 18 touches the ground. Consequently, the rear wheel 18 swings from side-to-side as illustrated in dotted outline in FIG. 3, rather than rotating about the vertical centerline 50. This arrangement permits relatively sharp turns to be made with minimum wear on rear wheel 18. It should also be noted that the wheel 18 and clevis member 38 comprise a caster-like arrangement which, combined with the inclined steering axis 48, keeps the wheel 18 tracking whereby the vehicle 10 tends to move forward along a straight line. Consequently, if the steering wheel 24 is released at the completion of a turn, the wheel 18 will return to its normal straight position.

Figure 5:
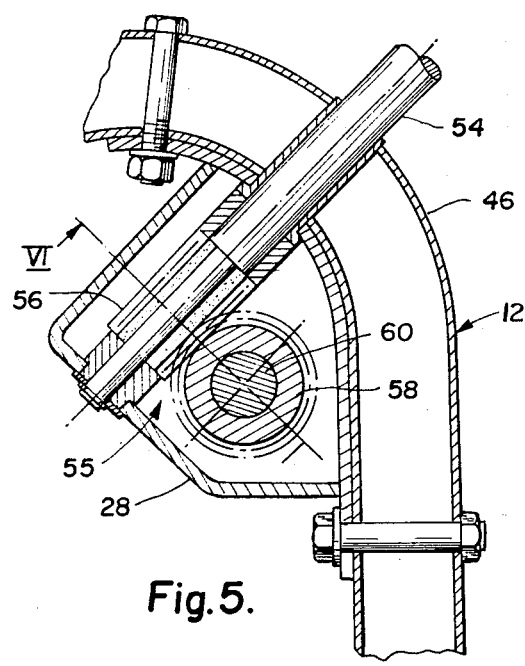
FIG. 5 is a cross-sectional view, taken substantially along the line V—V of FIG. 6, illustrating steering gear means.
Figure 6:
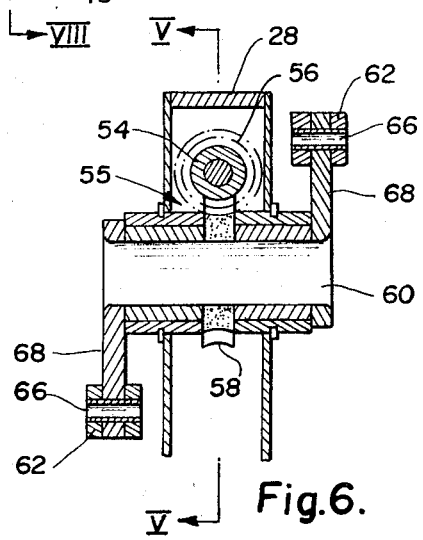
FIG. 6 is a cross-sectional view, taken along the line VI—VI of FIG. 5, further illustrating a steering gear means.

Referring now to FIGS. 1, 5 and 6, it will be seen that the steering wheel 24 has a central shaft 54 extending through the central frame member 46 into the gear box 28 containing gear means 55. The steering wheel 24 is adjustable axially along the central shaft 54. The gear means 55 comprises a worm 56 secured to the end of the central shaft 54 and disposed in meshing relation with a worm gear 58 which, in turn, is secured to a stub shaft 60 journaled to the gear box 28. It will be noted that the rotational axes of the worm 56 and the worm gear 58 are mutually perpendicular and that the number of threads on the worm 56 is considerably less than the number of teeth on the worm gear 58. To effect a turning of the worm gear 58 through a specific number of angular degrees, it is necessary to rotate the worm 56 through a greater number of angular degrees. Consequently, multiple revolutions of the steering wheel 24 are required to turn the rear wheel 18 and hence the vehicle 10.

Referring now to FIGS. 1, 3, 6 and 7, the linkage means 26 comprises a pair of generally vertical link arms 62 and a pair of generally horizontal link arms 64. One each of the link arms 62 and 64 is positioned on each side of the central frame member 46. As can best be seen in FIGS. 1 and 6, the vertical link arms 62 have their upper ends pivotally connected as at 66, to lever arms 68 which, in turn, are secured to the stub shaft 60. The lever arms 68 extend in diametrically opposite directions from the stub shaft 60 so that as the stub shaft 60 is rotated, one of the vertical link arms 62 will be raised while the other vertical link arm 62 will be lowered. The lower ends of the vertical link arms 62 are each pivotally connected to a separate link plate 70 which, in turn, is pivotally connected to the central frame 46. The horizontal link arms 64 have one of their ends pivotally connected to one of the link plates 70 and their opposite ends pivotally connected to universal joint members 72 (FIG. 7). The universal joint members 72 are, in turn, pivotally connected to extension arms 74 of the clevis member 38.

The overall arrangement is such that to make a right turn, for example, the steering wheel 24 is rotated in a clockwise direction, as viewed in FIG. 3. This action causes the right-hand vertical link arm 62 to be raised whereby the right-hand horizontal link arm 64 is pulled forwardly to turn the rear wheel 18 in a counterclockwise direction about the steering axis 48. At the same time, the left-hand vertical link arm 62 is lowered whereby the left-hand horizontal link arm 64 is pushed rearwardly to aid in turning the rear wheel 18 in a counterclockwise direction about the steering axis 48. To make a left turn, the above-described sequence will, of course, be reversed.

It should now be apparent that the above-described steering arrangement provides a smooth steering action which is much like the steering action of a conventional automobile. Consequently, the steering motion of the vehicle 10 is smooth rather than being jerky as is the case of the prior art tricycle vehicles. Although the child is able to whip or rotate the steering wheel 24 in a very rapid manner to effect a sharp turn, the rear wheel 18 will not be turned in such a quick manner that the vehicle 10 will upset.

*Drive arrangement*

The drive arrangement of the vehicle 10 will now be more fully described with reference to FIGS. 1–3 and 8, inclusive.

Referring now to FIG. 1, it will be seen that the torque transferring means 34 comprises a drive sprocket 76 rotatable by the foot pedals 30, a driven sprocket 78 for rotating the axle means 20 and an endless drive chain 80 extending between and around the sprockets 76, 78. A chain guard 82 is provided which, as can be seen in FIG. 1, covers the drive sprocket 76, and substantially all of the driven sprocket 78 and the drive chain 80. Thus the child's pant leg is prevented from being caught between the drive sprocket 76 and the endless drive chain 80.

It is important to note that the foot pedals 30 are positioned ahead of the front drive wheels 16. In this arrangement, the child's weight is more evenly distributed ahead of and behind the front drive wheels 16, especially during driving of the vehicle 10. Therefore, the vehicle 10 is considerably more stable than if the foot pedals were mounted directly on the axle means 20 or if the foot pedals were positioned between the wheels 16 and 18 as is the case of some prior art tricycle vehicles. Furthermore, by positioning the foot pedals 30 ahead of the drive wheels 16, better traction is afforded between the drive wheels 16 and the ground.

Referring now to FIGS. 2 and 8 and in particular to FIG. 8, the axle means 20 comprises two axles 84, 86 each of which is journaled on spaced bearings 88 carried within the ends of tubular housings 90. A generally U-shaped member 92 secured to the central frame member 46, connects the adjacent inner ends of the tubular housings 90 while side frame members 94, fragments of which are shown in FIG. 8, are secured, as by welding for example, to the outer ends of the tubular housings 90. Hence, the tubular housings 90 are maintained in coaxially aligned relation as are the axles 84, 86. The wheels 16 are secured to the outer ends of the axles 84, 86 by means of rivets 95, for example, and rotate therewith on the bearings 88.

The aforesaid differential gearing means 36 connects the axles 84, 86 and permits the wheels 16 to rotate at the same angular velocity when the vehicle 10 is moving in a straight line and to rotate at different angular velocities when the vehicle 10 is turning. As can be seen in FIG. 8, the differential gearing means 36 comprises two miter gears 96, 98 secured to the adjacent inner ends of the axles 84, 86, respectively, by means of pins 100. A housing 102 surrounds the miter gears 96, 98 and has hubs 104 rotatably mounted on the ends of the miter gears 96, 98 whereby the housing 102 is rotatable about the coaxial central axes of the axles 84, 86. A bushing member 106 is carried by the inner ends of the axles 84, 86 and is freely rotatable thereon. The bushing member 106 has oppositely extending shafts 108 having their ends engaged in openings 110 provided in the housing 102. Consequently, the housing 102 and the bushing member 106 are connected and rotate in unison about the axles 84, 86. The shafts 108 carry idler miter gears 112 each of which is disposed in meshing engagement with the miter gears 96, 98. The idler miter gears 112 are rotatable about the shafts 108 of the bushing member 106.

As can be seen in FIG. 8, the driven sprocket 78 is secured to the housing 102 and rotates the same when a child forcibly rotates the foot pedals 30, shown herein in dotted outline. As the driven sprocket 78 is rotated, the housing 102, the idler miter gears 112, the miter gears 96, 98 and the axles 84, 86 will rotate in unison to drive the wheels 16. If the vehicle 10 is being driven forward in a substantially straightline path of travel, the wheels 16 will rotate at the same speed. However, when the vehicle 10 is turning, the wheel on the inside of the turn will roll over a shorter distance than the wheel on the outside of the turn. The idler miter gears permit the shafts 84, 86 to be driven at different angular velocities when the vehicle 10 is executing a turn. Consequently, the angular velocities of the wheels 16 are automatically adjusted to compensate for the difference in the length of the circumferential path of travel of each wheel. Therefore, the wheels 16 will not skid during a turn and hence are subjected to a minimum amount of wear. It should also be apparent that this differential drive arrangement permits the vehicle 10 to execute turns which are sharper or tighter than those vehicles not equipped with a differential drive arrangement.

*Foot pedal adjustment*

Referring again to FIG. 1, it will be seen that the foot pedals 30 are detachably connected to and supported on a plate 114 having a plurality of apertures 116. The apertures 116 are equidistant from the central axis of the drive wheels 16. Consequently, the foot pedals 30 and the drive sprocket 76 may be positioned at a number of locations, corresponding to the apertures 116, closer to or further from the seat 14. For example, the chain guard 82 has been shown, in dash-dot outline, at a location which places the foot pedals 30 at the closest permissible distance with respect to the seat 14. The solid line showing of the chain guard 82, the drive sprocket 76 and the foot pedals 30 corresponds to an intermediate location on the plate 114 relative to the seat 14. Means for detachably connecting the foot pedals 30 to the plate 114 has not been illustrated inasmuch as such connecting means is within the purview of one skilled in the art.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. In a steerable toy vehicle of the rider powered type, having a frame, a driver's seat secured to said frame, and three ground engaging wheels journaled to said frame, two ahead of and one to the rear of said driver's seat, the improvement comprising: a pair of spaced-apart, connected foot pedals, means for mounting said foot pedals on said frame for rotation about a pedaling axis extending substantially parallel to the rolling axis of said ground engaging wheels, said foot pedals being supported ahead of all of said ground engaging wheels, axle means journaled to said frame intermediate said driver's seat and said foot pedals for rollably connecting said two engaging wheels ahead of said driver's seat to said frame, and means for transferring torque from said foot pedals to said axle means and hence to the wheels connected thereto to effect movement of said vehicle.

2. The steerable toy vehicle as defined in claim 1 wherein said foot pedals are detachably connected to said mounting means and said mounting means includes means for supporting said foot pedals at a plurality of spaced locations each equidistant from said axle means, said foot pedals being positionable at a number of distances from said seat whereby said vehicle will accommodate riders of different heights.

3. The steerable toy vehicle as defined in claim 1 wherein said torque transferring means comprises a drive sprocket rotatable by said foot pedals, a driven sprocket rotatable with said axle means, and an endless drive chain connecting said drive sprocket to said driven sprocket.

4. The steerable toy vehicle as defined in claim 1 wherein said single ground engaging wheel is positioned behind said driver's seat and is journaled to said frame for arcuate movement about a steering axis which extends transversely of the rolling axis of said ground engaging wheels and which is inclined forwardly toward said driver's seat, and including means for turning said single ground engaging wheel about said steering axis as desired for steering said vehicle.

5. The steerable toy vehicle as defined in claim 1 wherein said single ground engaging wheel is journaled to said frame to the rear of said driver's seat for steering said vehicle, and including means for turning said single ground engaging wheel to effect steering of said vehicle, said turning means comprising a steering wheel adjacent said driver's seat and having a central shaft rotatably connected to said frame, linkage means extending from said steering wheel and connected to said single ground engaging wheel and adapted to turn the same about said steering axis, and gear means for coupling said linkage means to said central shaft and arranged to effect turning of said single ground engaging wheel by multiple revolutions of said steering wheel.

6. The steerable toy vehicle as defined in claim 5 wherein said gear means comprises a worm carried by said central shaft, a worm gear journaled to said frame in meshing relation with said worm, the rotational axes of said worm and said worm gear being substatnially mutually perpendicular, the number of threads on said worm being less than the number of teeth on said worm gear whereby rotation of said worm gear and hence said single ground engaging wheel is effected by multiple revolutions of said steering wheel.

7. The steerable toy vehicle as defined in claim 1 wherein said axle means comprises two coaxially aligned shafts journaled to said frame, each of said shafts having one wheel of said pair of said ground engaging wheels secured to the outboard end thereof, and including differential gearing means for connecting said coaxially aligned shafts and arranged to rotate said shafts simultaneously during straight-ahead movement of said vehicle and for rotating said shafts at different angular velocities during turning of said vehicle in accordance with the length of travel of said pair of said ground engaging wheels, said torque transferring means being connected to said differential gearing means and operable therethrough for forcibly rotating said shafts and hence said pair of said ground engaging wheels.

8. The steerable toy vehicle as defined in claim 1 wherein said single ground engaging wheel is journaled to said frame to the rear of said driver's seat for steering said vehicle, and including means for turning said single ground engaging wheel and thereby steering said vehicle, and differential gearing means connected to said axle means and driven by said torque transferring means for rotating said pair of said ground engaging wheels at substantially equivalent angular velocities during forward movement of said vehicle and at different angular velocities during turning movement of said vehicle to compensate for the different distances traveled by each of said ground engaging wheels.

References Cited

UNITED STATES PATENTS

| | | | |
|---|---|---|---|
| 1,754,430 | 4/1930 | Kraeft | 280—112 |
| 1,778,143 | 10/1930 | Carlson | 280—259 |
| 2,177,793 | 10/1939 | Taylor | 280—270 |
| 2,311,424 | 2/1943 | Weller | 280—261 |
| 2,501,035 | 3/1950 | Doak | 280—261 |
| 2,602,677 | 7/1952 | Connolly | 280—261 |
| 3,266,589 | 8/1966 | Harris | 280—92 X |
| 3,282,606 | 11/1966 | Casner | 280—261 |

FOREIGN PATENTS

| | | |
|---|---|---|
| 13,370 | 10/1896 | Switzerland. |
| 501,515 | 11/1954 | Italy. |
| 850,061 | 10/1939 | France. |

KENNETH H. BETTS, *Primary Examiner.*